UNITED STATES PATENT OFFICE.

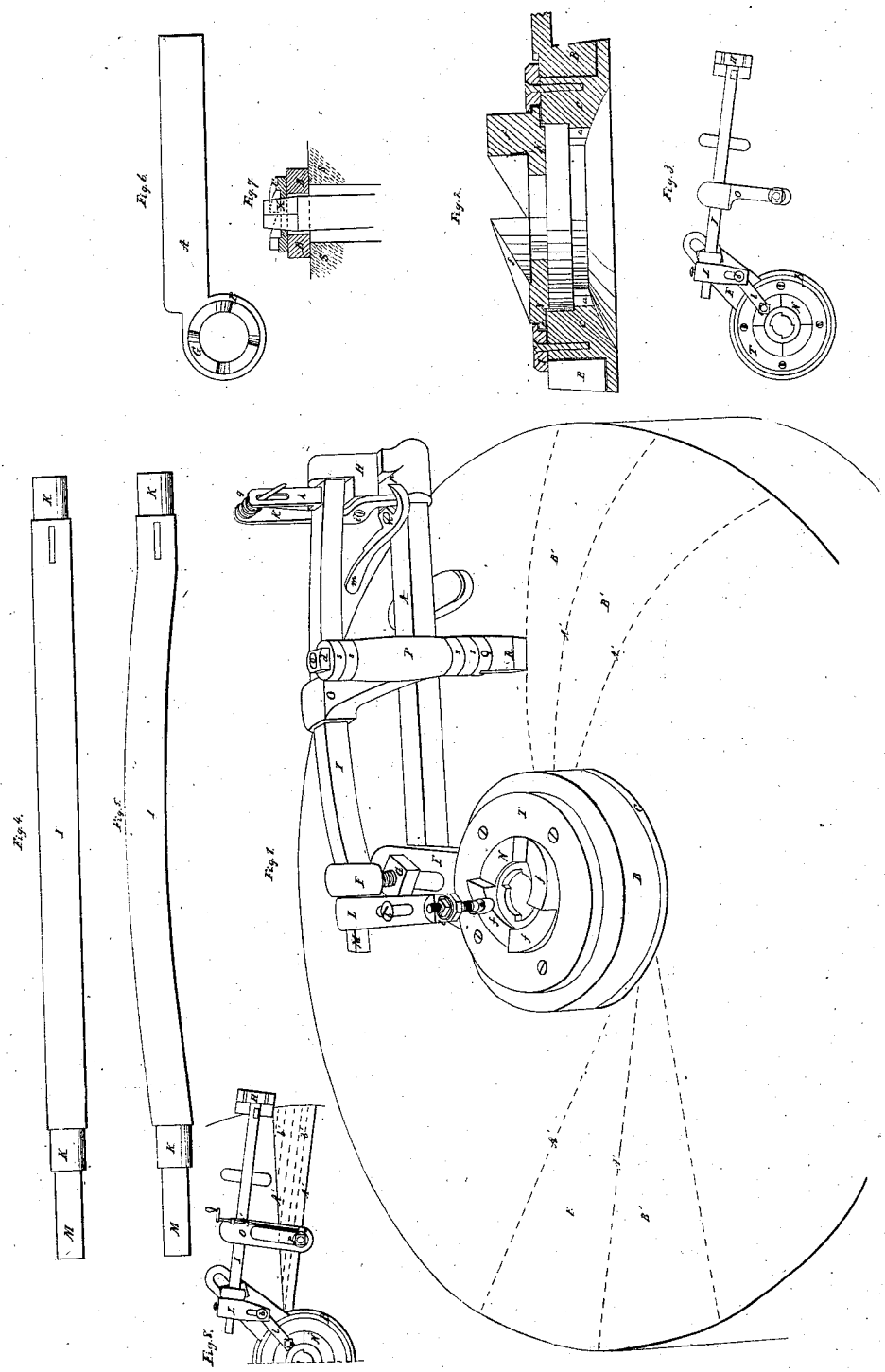
Cummings & Dadmun,
Dressing Millstones.
Nº 10,269.  Patented Nov. 22, 1853.

WILLARD B. CUMMINGS, OF TYNGSBOROUGH, AND N. P. DADMAN, OF CHELMSFORD, MASSACHUSETTS, ASSIGNORS TO W. B. CUMMINGS, OF TYNGSBOROUGH, N. P. DADMAN, OF CHELMSFORD, AND C. A. BLOOD, OF NORTH CHELMSFORD, MASSACHUSETTS.

MACHINE FOR DRESSING MILLSTONES.

Specification of Letters Patent No. 10,269, dated November 22, 1853.

*To all whom it may concern:*

Be it known that we, WILLARD B. CUMMINGS, of Tyngsborough, and N. P. DADMAN, of Chelmsford, both in the county of Middlesex and State of Massachusetts, have invented certain new and useful Improvements upon Machines for Dressing Millstones; and we hereby declare the following to be a full, clear, and exact description of the same, reference being had to the annexed drawings, making part of this specification.

The machines to which our improvements are applicable are of the class patented by S. W. and R. M. Draper May 25th, 1852, and in order that our improvements may be fully understood and appreciated it will be necessary to refer to this patent, and to point out some of its defects.

Figure 6 of the accompanying drawings is a plan of the arrangement made use of by Draper for driving the cam which actuates the pick, and Fig. 7, is a section through the same.

A is a bar or bed piece, with a circular head piece B, which is laid flat upon the top of the stone S, to be dressed, but not made fast to it, as it is necessary that it be turned not only each time a new furrow is to be dressed, but also during the operation of dressing, as there is no other means by which the pick may be made to follow the furrow when the stone is dressed to a "draft." Upon this circular head piece B, rests and revolves the cam G, which gives motion to the hammer and pick. This cam is driven by the mill spindle X, and as it rests directly upon the head piece B, the rapid revolution of the cam communicates a violent tremulous motion to the bar A which carries the pick, and the parts by which it is actuated, rendering it exceedingly difficult to keep it steadily in place, or to guide it with the required precision.

Our improvement consists in causing the cam which actuates the pick to revolve upon a block made fast to the stone or the mill bush, which block also serves as the bearing and guide for the head piece B, which arrangement entirely prevents any tremulous or other motion from being communicated by the revolution of the cam to the bar A, and the parts carrying and giving motion to the pick, which latter may at the same time be guided with the greatest nicety.

In order that others skilled in the art may understand and apply our invention we will proceed to describe its nature and operation.

Fig. 1 is a perspective view of the machine with our improvements applied. Fig. 2, is a section through the center of the apparatus. Figs. 3, 4, 5 and 8 are details which will be referred to hereafter.

In Figs. 1 and 2, C is the base block or pedestal, which is secured to the bed stone or mill bush by screws passing through the holes *a* or in any other appropriate manner. B is the circular head piece, resting and revolving upon the pedestal C. E is a slotted arm attached to and making part of the circular head B. A is a bed piece of cast iron or other suitable material, from one end of which rises the screw standard F, which passes through the slot in the arm E. G is a nut working upon the standard F, by tightening which the bar or bed piece A is clamped fast to the slotted arm and head piece B. H is a standard rising from the other end of the bed piece A. I is a rock shaft which may be straight or curved according to the shape of the furrow to be dressed, having gudgeons K at each end which fit in bearings of the standards F and H. L is a slotted arm fitting tightly upon the square portion M of the rock shaft I. This arm is made in two parts L, and *l*, which are secured together by the screw *b*, for a purpose which will be hereafter explained. Through the arm L a rocking motion is communicated to the shaft I from the cam N. O, is an arm fitted to the shaft I, and sliding freely thereon; upon the end of this arm is the hammer socket P, which is bored at right angles to the arm O, to receive the shank of the pick stock Q; this shank *c*, passes up through the hammer socket and is secured by the nut *d*. R is the pick secured to the pick stock Q. S are washers which are taken from above the hammer socket and placed below it as the pick wears up. N, is a cam having steps or inclines *f;* as these inclines pass beneath the roller or point *e*, the arm or driver L, is caused to rise and fall, for the purpose of giving the requisite motion to the pick. This cam N, rests and revolves upon the pedestal C, and is held in its place by the metallic ring T, which also confines the circular head piece B. The cam is caused to revolve by being fitted to the mill spindle. The blow of the hammer is increased and regulated by the spring $g$, one end of which bears against the metallic arm $h$, upon the rock shaft I, and the other against the lever $k$, having its fulcrum at $i$. The short arm of this lever bears against the curved arm of a lever $m$, having its fulcrum at $n$. When this lever is in such a position that the short arm of the lever $k$, rests against the point $p$, of the lever $m$, the spring $g$, is but slightly compressed, and exerts a corresponding influence upon the rock shaft and pick. When the lever $m$, is in such position that the lever $k$, bears against it near the fulcrum $n$, the spring $g$, is forcibly compressed, and the pick is thrown with a corresponding increase of force. The handle of the lever $m$, is placed within reach of the operator, so that at any instant he can vary the force of the blow as he sees the quality of the stone to vary.

In Fig. 8 is represented a construction of the arm O which I have adopted upon some of my machines to enable me more thoroughly to dress the lands after the furrows are completed. O is the hammer socket having a slot in which the pick stock is allowed to move back and forth, the motion of the latter being governed by the screw $g'$.

Operation: The runner being removed the pedestal C, is firmly secured to the eye of the lower stone, the circular head piece B is placed upon it, the cam N, is fitted to the spindle, and the plate T is secured in place. The cam is thus left free to revolve with the spindle, and the head piece B, to revolve as it is moved by the operator. In proportion to the "draft" to which the stone is to be dressed, the standard F is moved along the slot in the arm E until the line of motion of the pick is tangent to the circumference of the draft circle. The bed piece then remaining stationary, as the arm O, is moved along the bar I the pick R, will trace a furrow of the required draft. In order to accomplish this upon the machine as heretofore constructed it was necessary to move the bed piece a trifle at each successive blow of the pick, and there was no guide to the proper performance of the work, but the skill and judgment of the operator. With our improvement the bar I, becomes a perfect guide for any furrow, it only being necessary, when the instrument is once adjusted, to set the spindle in motion, and through the cam N to give the necessary motion to the pick, which is then moved along its guide rod I as required.

For the purpose of enabling a machine of a size adapted to dressing four foot stones, to operate upon stones of a larger diameter without (as was the case in the machines as heretofore constructed) the necessity of employing extra bed pieces, shafts, &c., we have adopted the following plan as represented in Fig. 3. The arm E is revolved so as to make an obtuse angle with the bed piece A and shaft I, the arm L as before stated, being made in two portions, and adjustable in any position, so that it may still reach the inclines upon the cam N. By this means the effective length of the shaft I is increased and the same machine is adapted to dressing stones of different diameter. For all straight furrows the bar I may be straight as in Fig. 4. For a circular dress this bar may be curved as seen in Figs. 1 and 5.

After the furrows have been cut, it becomes necessary that the surface of the stone be tooled or dressed in lines parallel with the furrows, and where the arm O is constructed as represented in Figs. 1 and 3 this can only be accomplished by moving the bar A during the operation; this it is desirable to avoid and for this purpose we have sometimes adopted an arrangement substantially similar to that represented in Fig. 8. The instrument having been adjusted to cut the main furrows $A'$, when these are completed the lands $B'$ are dressed in the lines $b'$ parallel with the furrows $A'$ by screwing in the hammer socket P as each successive line is dressed, without moving the bar A.

It is evident that our machine may be so arranged as to dress mill stones that are furrowed both to the right and left, as the bars A and I may be shifted over to the other side of the standard F the arm O also being reversed so as to work upon the opposite side of the bar I.

Having thus described our invention, what we claim as new and desire to secure by Letters Patent is—

The combination of the pedestal C, the head piece B, and the cam N, constructed and operating in the manner substantially as described, and for the purpose set forth.

In testimony whereof we have hereto set our signatures, this sixteenth day of April, A. D. one thousand eight hundred and fifty three.

WILLARD B. CUMMINGS.
NATHAN P. DADMAN.

Witnesses:
CHARLES BUTTERFIELD,
S. H. MERRILL,
CYRUS HAMBLET,